(12) United States Patent
Parker

(10) Patent No.: US 8,799,812 B2
(45) Date of Patent: Aug. 5, 2014

(54) SYSTEM AND METHOD FOR GEOGRAPHIC BASED DATA VISUALIZATION AND EXTRACTION

(76) Inventor: Cheryl Parker, San Francisco, CA (US)

( * ) Notice: Subject to any disclaimer, the term of this patent is extended or adjusted under 35 U.S.C. 154(b) by 664 days.

(21) Appl. No.: 13/077,379

(22) Filed: Mar. 31, 2011

(65) Prior Publication Data

US 2011/0270705 A1 Nov. 3, 2011

Related U.S. Application Data

(60) Provisional application No. 61/329,321, filed on Apr. 29, 2010.

(51) Int. Cl.
*G06F 3/048* (2013.01)
*G06Q 30/06* (2012.01)
*G06F 17/30* (2006.01)

(52) U.S. Cl.
CPC ........ *G06Q 30/0603* (2013.01); *G06Q 30/0641* (2013.01); *G06Q 30/0623* (2013.01); *G06F 17/30241* (2013.01)
USPC ....................................... 715/790

(58) Field of Classification Search
USPC ....................................... 715/790
See application file for complete search history.

(56) References Cited

U.S. PATENT DOCUMENTS

| 2003/0036963 | A1* | 2/2003 | Jacobson et al. ................ 705/26 |
| 2004/0119759 | A1* | 6/2004 | Barros ......................... 345/853 |
| 2008/0059889 | A1 | 3/2008 | Parker et al. |
| 2011/0218985 | A1 | 9/2011 | Camper |

* cited by examiner

*Primary Examiner* — Enrique Iturralde
(74) *Attorney, Agent, or Firm* — Law Offices of Steven H. Meyer, LLC

(57) ABSTRACT

A displayed map is overlaid with a map-based graphical user interface (GUI). The GUI provides one or more related translucent views corresponding to the displayed map, where each view is associated with a dataset. The GUI also provides interlocked queries and analysis tools to probe the dataset. Each view comprises a polygon layer corresponding to the displayed map and a point layer corresponding to the displayed map, where the polygon layer and the point layer work in tandem to simultaneously display both aggregated and disaggregated data across the displayed map. A selection of a specific item of the point layer or a sub-region of the polygon layer is received from the user. In response, both the point layer and the polygon layer are modified so as to provide additional selectable information corresponding to the received selection and also additional selectable information that may be of interest to the user.

23 Claims, 20 Drawing Sheets

Figure 19

1019
Administrative
Accounting GUI

User Inputs:

Username:

Password:

Select report type: ▼

Select accounting period: ▼

1020
Input form for
Administrator
to request an
Accounting Report

Outputs:

Requested Report:

| Accounts | # Records | Price | Date |
|---|---|---|---|
| Account 1 | 500 | $80.00 | 2/1/11 |
| Account 2 | 752 | $120.32 | 2/1/11 |
| Account 3 | 334 | $53.44 | 2/1/11 |

Export Report

1021
Outputs from
Report Request

1022
Button for
Exporting Report
as CSV or PDF

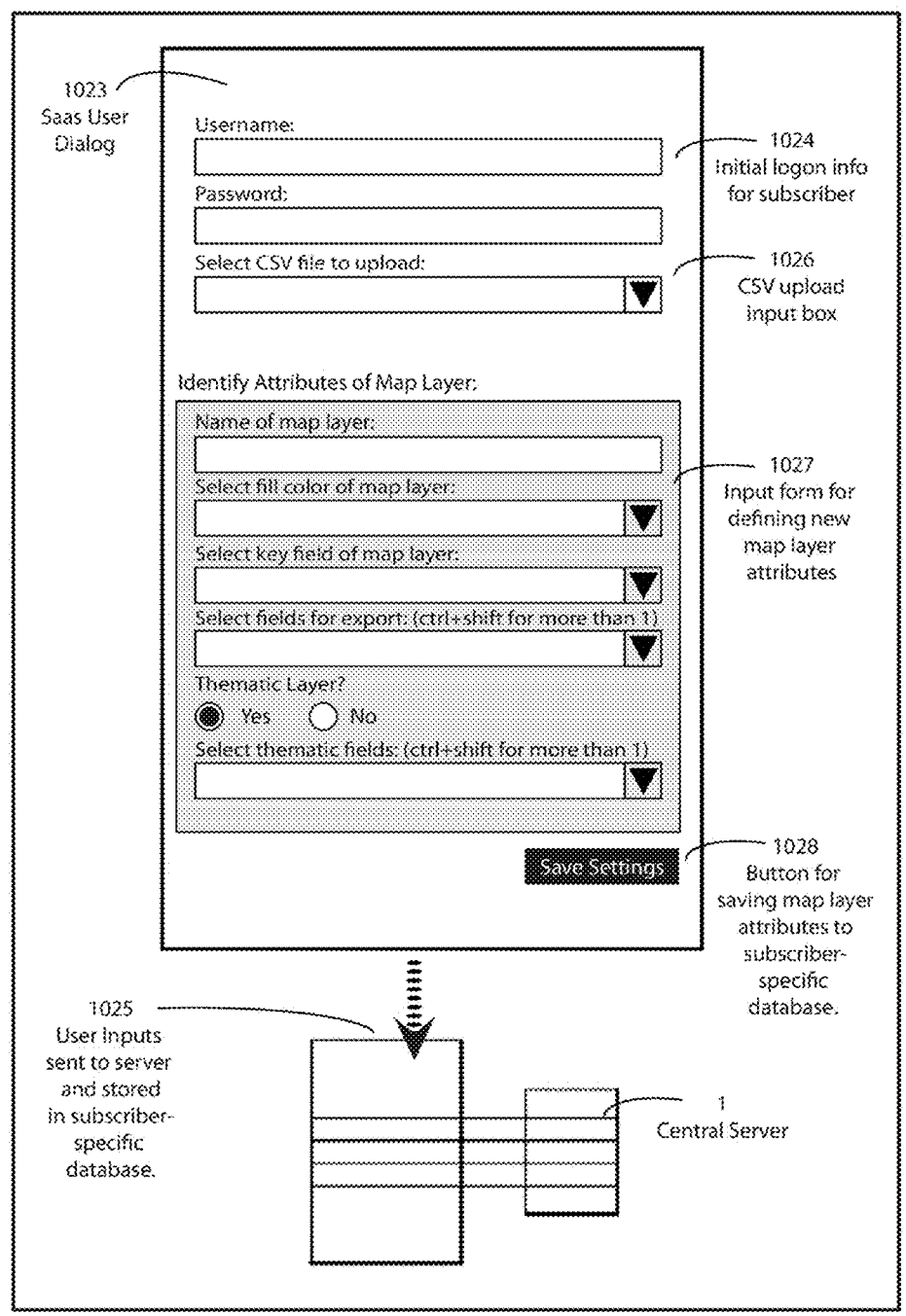

SYSTEM AND METHOD FOR GEOGRAPHIC BASED DATA VISUALIZATION AND EXTRACTION

CROSS-REFERENCE TO RELATED APPLICATION

The present application claims priority from U.S. Provisional Pat. Application No. 61/329,321, filed on Apr. 29, 2010, which is hereby incorporated by reference in its entirety.

TECHNICAL FIELD

The present invention embodiments include a method, system, and software stored on a tangible memory which combines a web Geographic Information System (GIS), a mapping service, an e-commerce interface for selling address-based datasets and a Software as a Service (SaaS) interface for uploading user datasets.

BACKGROUND OF THE INVENTION

The invention as set forth in the present disclosure combines aspects of 3 fields: (1) web GIS software, (2) e-commerce for address-based datasets and lists (such as business lists, job listings, real estate listings, etc), and (3) local search via web mapping services (such as Google Maps, YaHoo Local Maps or Bing Maps). The invention also introduces time-series and 3-D (three dimensional) thematic visualization to the combined aspects of these 3 disciplines.

An audience for the preferred embodiment includes small businesses, analysts and local government professionals who have a need for time series-based datasets and visualization tools which present economic data in a spatially thematic way and also allow for data extraction and download via spreadsheets, pdf reports and GIS layers (or "shapefiles"). These professionals currently use a combination of techniques and technologies in order to achieve temporal-spatial analysis and data extraction. No single method, system, or software currently satisfies all the needs, forcing users to combine several technologies, thereby costing users both time and money.

Following is a more detailed description of related art:

Web GIS Services:

A web GIS service is a centrally hosted GIS database that can be accessed by most any web browser. A pertinent example is the SSRI "Business Analyst Online" tool, an on-line product of SSRI Corporation of Redlands, Calif., which provides subscribers with the ability to view, search and analyze centrally-served demographic and economic national datasets and services through a mapping application GUI (Graphic User Interface) that is accessible via most any web browser. Business Analyst Online's analytical capacity is limited however, in that it only offers business information for the current year, only provides users with the ability to specify a radius-around-a-point in order to run a summary, and only offers polygonal thematic mapping that shows data distributed at an aggregated level, but not a disaggregate one. The tool lacks more advanced spatial/temporal analytical tools such as those for time series analysis, 3-D visualization, local area aggregated reports for selected census areas, and combined point/polygon thematic mapping.

Other web GIS services such as the "Urban EcoMap" tool, a collaborative effort involving Cisco IBSG and San Francisco's Department of the Environment, provide aggregated area reports and thematic polygonal mapping, but are limited in that (1) they only show data at an aggregated level with no point map layers, (2) data are only displayed for one type of geographic boundary, usually postal codes, and do not re-aggregate for smaller/larger geographies based upon zoom level and (3) they are not time series-based.

Web Interfaces for National list providers:

Various National list providers (InfoUSA, from Infogroup of Omaha, Nebr.; Dun & Bradstreet of Short Hills, N.J., and Claritas from Nielsen Corporation of New York, N.Y.) provide web GUIs for users to select a cross-section of data based upon user-defined criteria and then to purchase and download the list via a secure e-commerce interface. Limitations inherent in the interfaces include:

No spatial component. The GUIs of the aforementioned providers are HTML-form-based, not map-based, and thus users must rely on naming fairly large regions (zip codes, cities) in order to define the geographic extent of the dataset.

No ability to see data before purchase. The GUIs each provide an interface with a linear sequence for purchasing data: users fill out a form and pay for the data before they can see what they are buying.

Either one of these limitations can lead to users (1) purchasing more data than necessary because lists are priced by number of records and, possibly, (2) buying the wrong set of data, given that users cannot see the corresponding mapped data prior to purchase.

Local search via web mapping APIs (such as Google Maps, YaHoo Local Maps or Bing Maps):

All major search engines (Google, Yahoo, Bing) provide web mapping services that enable users to search a map for local amenities near a chosen location. These "local search" map-centric services enable users to enter a business type or establishment name and see the search results displayed in a selectable point list and as points on the map. Users may select any point of interest and get more details about that establishment, such as contact info, menus, hours of operation, and links to other related web pages. While useful for finding an establishment to visit, these search engines are limited in what they offer analysts. For example, users are not able to download/extract a list of data points, cannot view an aggregated summary of the data elements, such as an industry sector distribution report that includes a breakdown of businesses, jobs and sales per each industry sector, there is no ability to do polygonal thematic mapping, and there is no ability to do time series or 3-D analysis.

SUMMARY OF THE INVENTION

The limitations of the aforementioned related art are addressed by the present invention in which a computing system displays a map on a display associated with the computing system and overlays the displayed map with a map-based graphical user interface (GUI). The GUI provides one or more related translucent views corresponding to the displayed map, where each view is associated with a particular dataset. The view also provides interlocked queries and analysis tools to probe the dataset.

The view comprises a polygon layer corresponding to the displayed map and a point layer corresponding to the displayed map, where the polygon layer and the point layer work in tandem to simultaneously display both aggregated and disaggregated data across the displayed map. In particular the point layer overlays the displayed map and shows for each of a plurality of specific items a location of the specific item on the displayed map. Each shown item is tied to and listed in a selectable point list displayed by the GUI on the display. Likewise, the polygon layer overlays the displayed map and shows a thematic display of information aggregated to sub-regions on the displayed map. The aggregated information for each sub-region is derived from the items in the point layer located on the displayed map within the sub-region.

A selection of one of the specific items of the point layer or one of the sub-regions of the polygon layer is received from the user. In response thereto, both the point layer and the polygon layer are modified so as to provide additional selectable information corresponding to the received selection and also to provide additional selectable information that may be of interest to the user.

BRIEF DESCRIPTION OF THE DRAWINGS

The foregoing summary, as well as the following detailed description of embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 19 is a diagram showing an Administrative Accounting GUI.

FIG. 20 is a diagram showing an SaaS user dialog used by subscribers to upload map layers.

DETAILED DESCRIPTION OF THE INVENTION

A present invention embodiment includes a system that weds a web GIS system with both an e-commerce interface for selling address-based datasets and a Software as a Service (SaaS) interface for uploading/editing local datasets. The system adds value to both web GIS and e-commerce (1) by providing GIS spatial and temporal analysis tools to e-commerce websites for address-related data, such that users are able to view address-based datasets in a spatial/temporal context prior to purchasing, and (2) by bringing sophisticated yet user-friendly GIS analysis tools to a consumer market.

Figure 1:
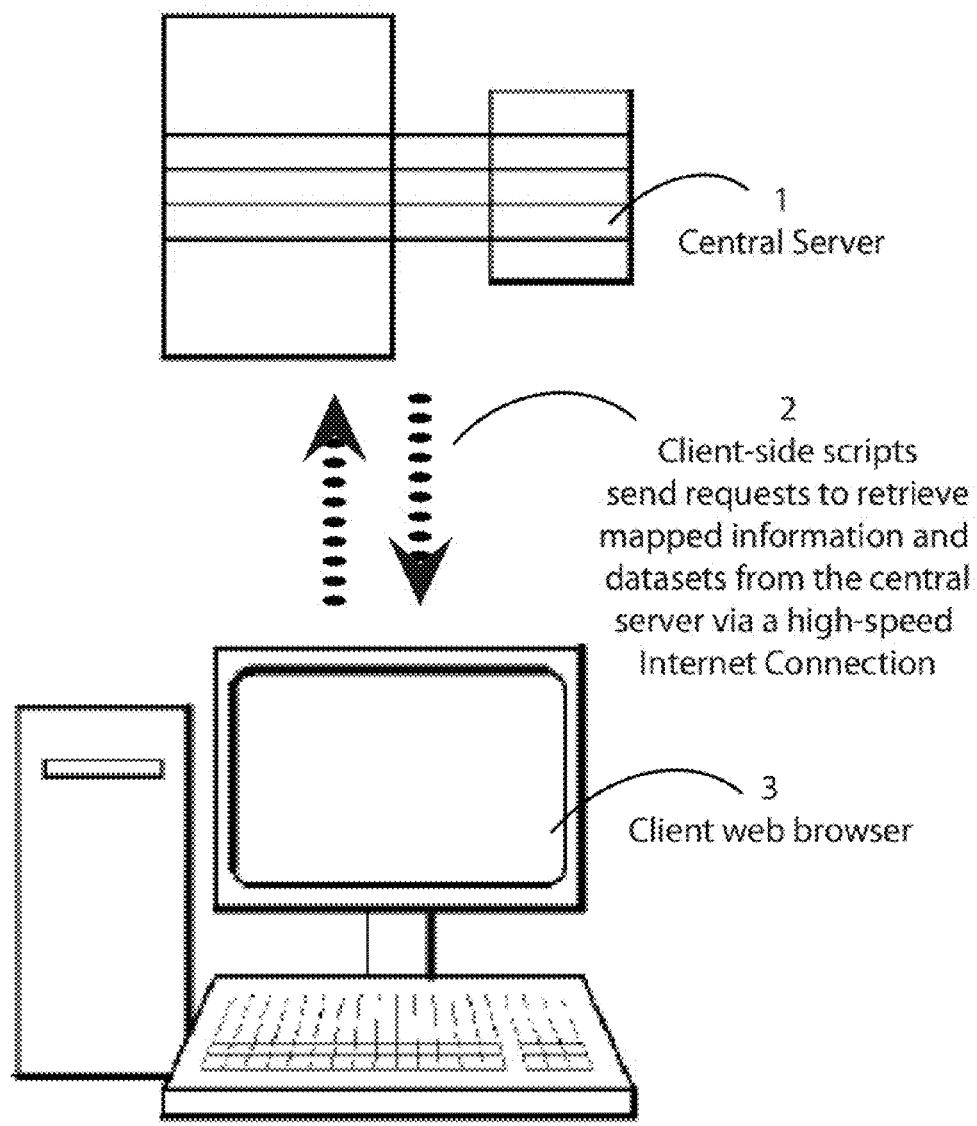
FIG. 1 is a diagram of the central server and client web browser.

As shown in FIG. 1, the present invention may be implemented by a central server 1 or the like and is available as a fully functioning software system available via most any web browser 3 or the like on a computer system or the like. All major databases for the system reside on the central server 1 and are passed to the client web browser 3 via a high speed Internet connection or the like. More precisely, client side scripts from the web browser 3 send requests 2 to the central server 1 to retrieve information for maps, businesses, demographics, and other statistics which will be displayed through the web browser 3.

Figure 2:
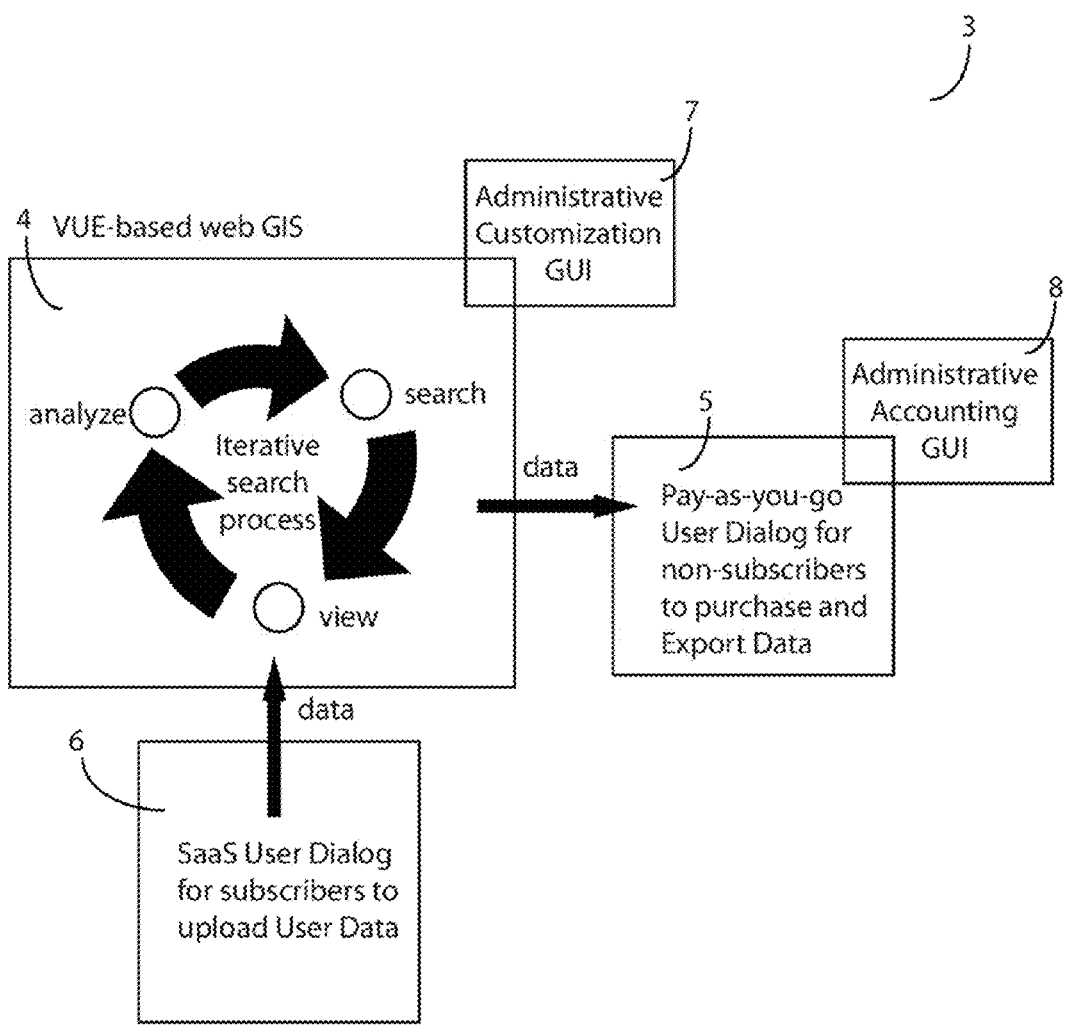
FIG. 2 is a diagram of major system components.

More specifically, referring to FIG. 2, the system is composed of the following components: a "VUE-based" web interface 4 or the like which provides GIS through the client web browser 3, a "pay-as-you-go" web interface 5 which, when combined with the VUE-based interface, enables non-subscribers to download data and pay for only what they need, and a SaaS web interface 6 or the like which enables subscribers to upload, view and manipulate local datasets via the client web browser 3, providing the familiarity of a desktop GIS within the context of centrally served, continually updated National datasets. Each component is described in detail below.

1. VUE-Based Interface

Figure 3:
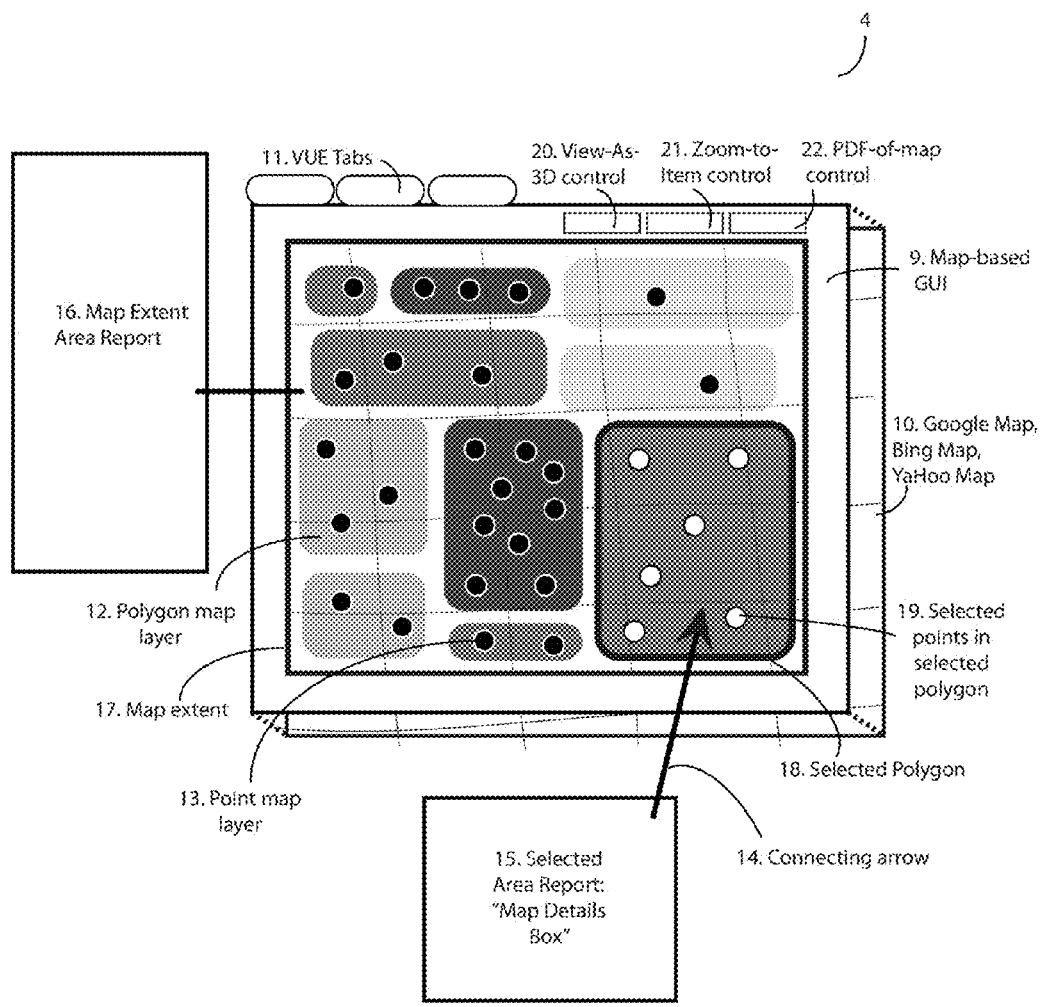
FIG. 3 is a diagram of VUE components.

Referring to FIG. 3, a present invention embodiment features a map-based GUI 9 that overlays a map 10 from a web mapping service such as Google Maps, Bing Maps, Yahoo Maps, or the like and provides multiple "VUEs" to an underlying base map. A VUE is a themed "lens" into a locality as represented by the underlying map 10 as provided by the mapping service. This lens is associated with a specific dataset, such as businesses, jobs, land parcels, energy use, etc., and provides interlocked queries, thematic mapping, and 3-D temporal and spatial analysis tools to probe the dataset. Each VUE is tied to preset global variables which can be modified by the user, with preset interlocked queries, thematic maps and local area reports executing as soon as a user enters a VUE. For multi-year time series datasets, users can move between years via an interactive timeline/year-select control, providing a user with the ability to quickly see a 3-dimensional spatial-temporal distribution of a database across a local area.

An embodiment may include multiple related VUES, where users may navigate between VUEs by clicking among tabs 11. Given that the underlying base map stays focused on the same area as a user tabs between VUEs, users are able to quickly contrast and compare the spatial distribution of several related themed datasets for the same locality.

Figure 4:
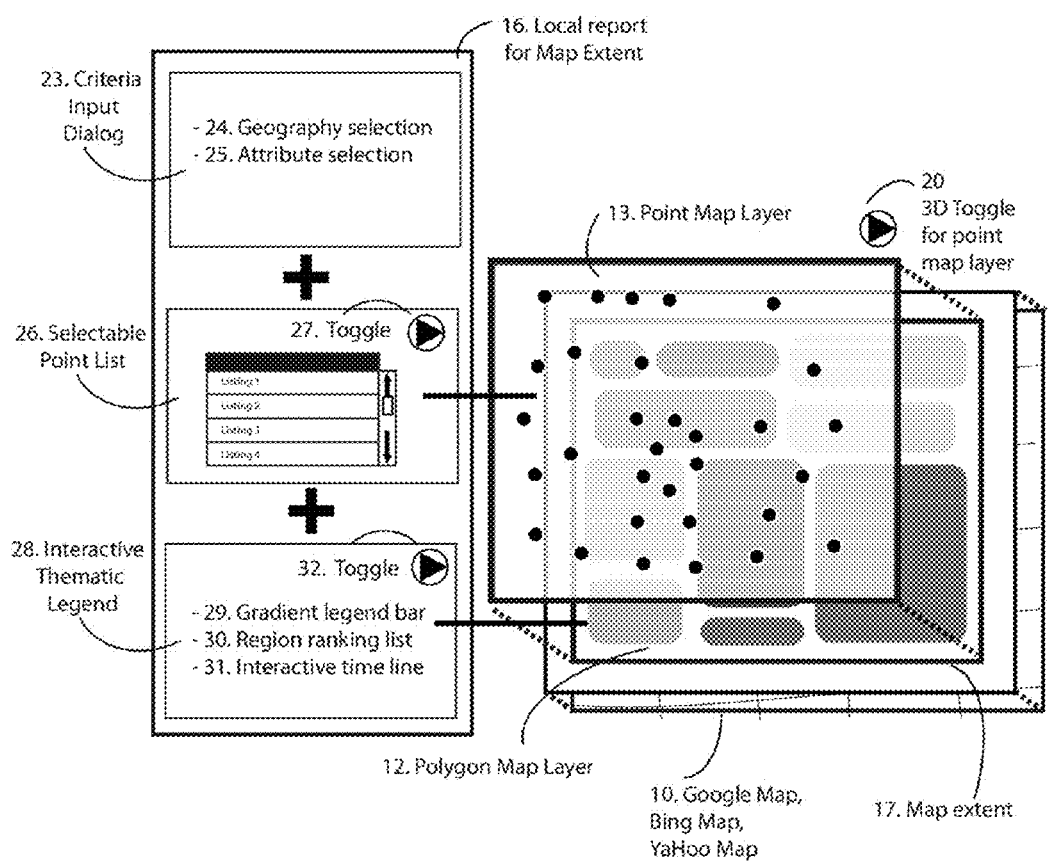
FIG. 4 is a diagram of the local report for map extent.

The nature of the map display makes a VUE unique. As shown in FIG. 4, two map layers including a polygon layer 12 and a point layer 13, work in tandem to simultaneously display both aggregated and disaggregated data across the map.

Point layers: Point layers 13 overlay the map 10, showing the location of specific (i.e., disaggregated) elements such as businesses, jobs, solar panels, etc. as per pre-set or user-defined search criteria via a criteria input dialog 23. For example, a business VUE point layer may include businesses, and a solar energy VUE point layer may include permits for solar panel installations. These mapped points are also tied directly to a selectable point list 26, enabling a user to select an item from the list and simultaneously select the corresponding mapped item or vice versa. Selecting an item from the list or map also opens a draggable "map details box" 15 (FIG. 3) which displays more detailed information about the selected point element.

A point layer 13 can be toggled on/off via toggle 27. When the toggle 27 is in the off position, the point layer is removed from the VUE and thus both the corresponding map layer 13 and selectable point list 26 disappear. The "on" position redraws the corresponding map layer 13 and repopulates the corresponding selectable point list 26 depending upon the defined geographic coordinates of the map extent 17.

Polygon layers: Polygon layers 12 provide a colored (or thematic) display of information aggregated to sub regions on a map (such as census tracts, city blocks, neighborhoods). These layers 12 serve as a backdrop to the point layers 13 or, if the point layers 13 are all toggled off 27, can be stand-alone.

Changing a global variable via a criteria input dialog 23 simultaneously redraws both polygon 12 and point 13 layers. For example, in a VUE which displays the location of businesses, the regions represented within the polygon layer 12 may be colored according to the number of total businesses within a user-specified industry sector as set by an attribute 25 in criteria 23, with regions having a greater concentration of businesses rendered darker in value and those with fewer businesses, rendered lighter. The point layer 13, in tandem, will show the actual location of the specific businesses within that selected industry sector relative to the regional boundary. Toggling a "Display-as-3-D" control toggle 20, in turn, may render the points as spikes, for example, with spike height being determined by number of employees at each establishment, thereby immediately showing the precise location of the largest employers within the colored region.

In various embodiments, the polygon layer 12 dynamically redraws and re-colors itself as larger or smaller aggregated regions depending upon the zoom level of the underlying map 10. Thus, if a user is viewing the map 10 from the scale of a whole city, for example, the "backdrop" polygonal thematic layer 12 may feature zip codes. In the case of a business-related VUE, zip code polygons 12 may be colored according to the number of businesses within each zip code. If a user then chooses to zoom-in to a neighborhood scale, for example, the polygon layer 12 may recolor as smaller census tracts, showing an aggregated depiction of the spatial distribution of businesses. Further, zooming in to a street level may for example re-render the polygon layer 12 as yet smaller colored census blocks and zooming to a building level may for example re-render such polygon layer 12 as colored parcels of land.

The point and polygon layers 12, 13 may for example be rendered by the techniques described in U.S. Patent Application Publication No. 2008/0059889 (Parker et al.), entitled "System and Method of Overlaying and Integrating Data with Geographic Mapping Applications", which corresponds to the aforementioned U.S. patent application Ser. No. 11/847,039, filed on Aug. 29, 2007 and which is hereby incorporated by reference in its entirety.

Local Area Reports: All VUEs feature local area reports, each of which may be provided in a displayed box, such as is shown in FIG. 3. Local area reports may be provided for two levels of geography: (1) the area depicted within the map extent 17, and (2) a selected area (box 15).

Figure 5:
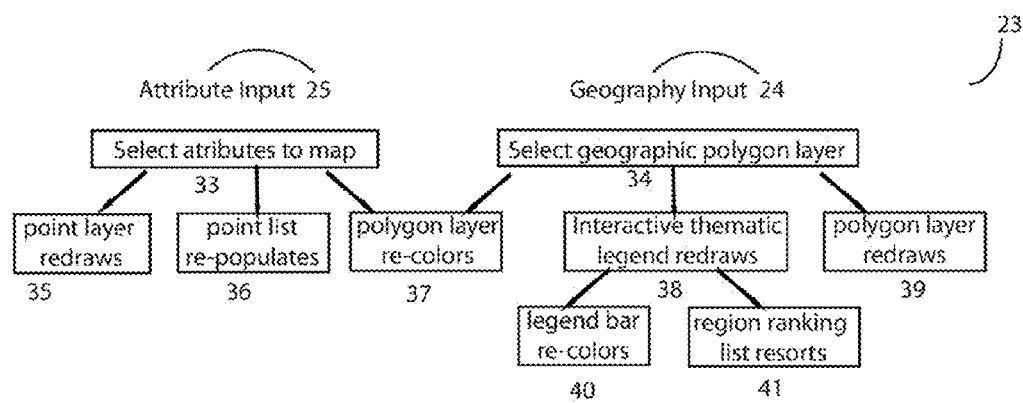
FIG. 5 is a diagram of the criteria input box.

1) Map Extent Area Report: Referring to FIG. 4, a "Map Extent Area Report" 16 summarizes the information shown within the area bound by the visible map (or "map extent" 17). It includes three major elements (a) A criteria input dialog 23 for changing the variables by which to query the map 10, (b) An interactive thematic legend 28 associated with the underlying polygon map 12, and (c) A selectable point list 26 associated with the point map 13.

a) Criteria input dialog 23. Referring to FIG. 5, users can change two types of mapped information via the criteria input dialog 23. The first type of information that can be manipulated concerns the type of mapped polygonal regions to be depicted 24, such as census boundaries (blocks, block groups, census tracts, zip codes, etc), or local boundaries (such as redevelopment areas, neighborhoods and so on). Choosing an option from the geography input list 34 will draw the polygonal boundaries on the map 39 and re-color the polygons thematically 37 based upon the other data attributes selected 33. In so doing, the thematic polygon layer 12 acts as a "backdrop" to the point layer 13. Choosing different "backdrop" polygon regions may result in a very different depiction of the map 10. For example, a colored council district map will look entirely different from a zip code map when drawn relative to the point layer, given that the polygons will have different sizes and shapes and therefore will depict a distinctly different colored composition relative to the points in the point layer 13. Depending upon the type of geo-political 'story' one wants to tell, this may be very significant to users. While the thematic polygon layer redraws 37, a thematic legend simultaneously redraws 38, causing its two sub-components to change accordingly: the legend bar re-colors 40 and the list of ranked regions re-sorts 41.

Figure 6:
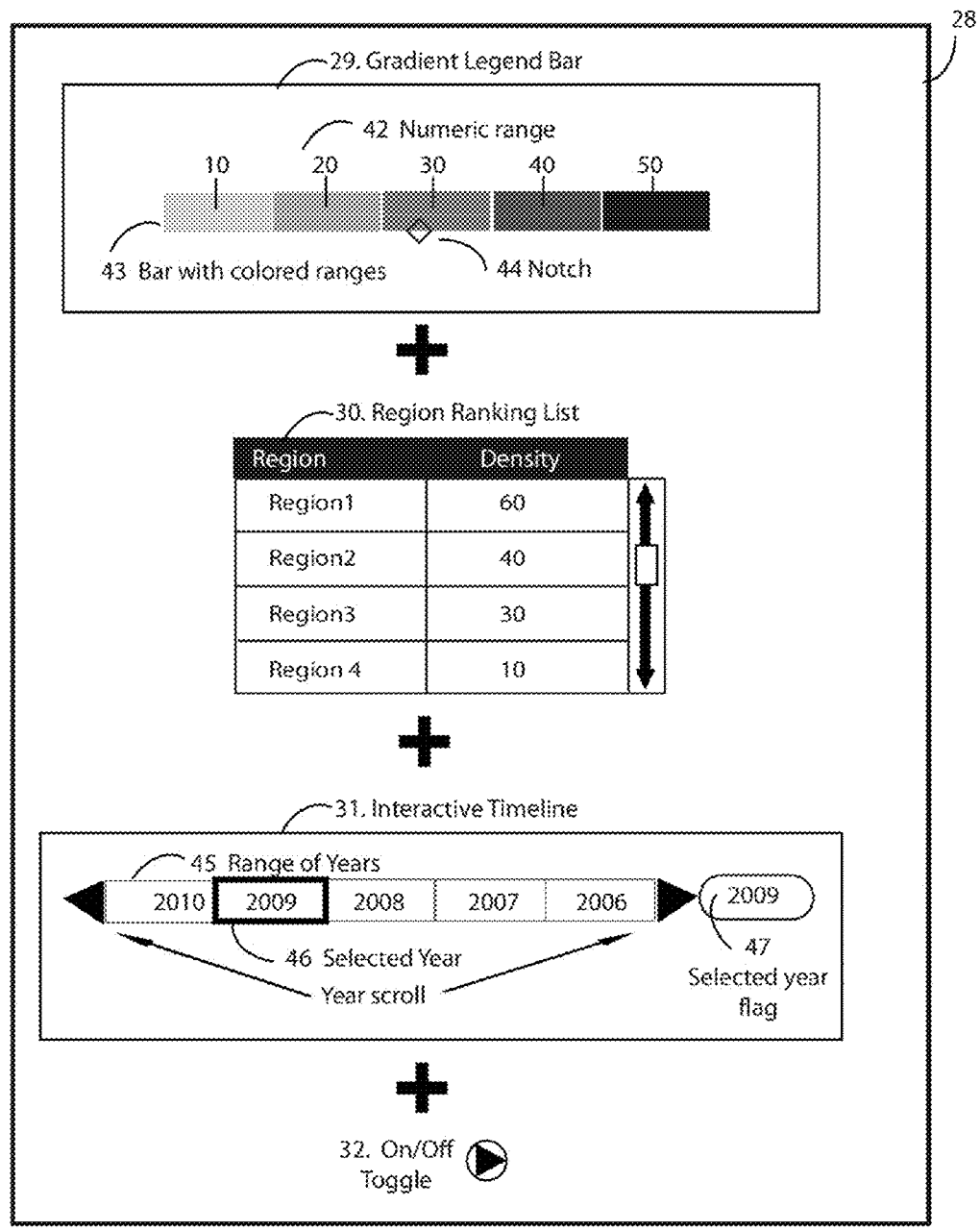
FIG. 6 is a diagram of the interactive thematic legend.

The second type of information that users can manipulate in the criteria input dialog 23 concerns the criteria 25 for setting the specific attributes 33 of the dataset to be displayed thematically in an aggregated manner via the polygon layer 12 (37) and in a disaggregated manner as individual points in the point layer 13 (35) with an accompanying interactive point list 36. For example, in a business-related VUE, users can choose from among many different industry sectors when setting the attributes to be mapped 33.

b) Interactive thematic legend 28. Referring to FIG. 4, the interactive thematic legend 28 directly corresponds to the base thematic polygon layer 12 of the map 10. As shown in FIG. 6, the thematic legend may have these elements:

a. A "gradient legend bar" 29 that provides a key to the range of colors depicted in the regions of the polygon map layer 12. Each color in the legend is associated with a numeric range 42 of possible values arranged linearly along a bar 43. In addition, if a user selects a polygon region 18 displayed in the polygon layer 12 atop the map 10 (FIG. 3), a notch 44 appears on the gradient legend bar 43 indicating where the selected area lies within the gradient range.

b. A "Region Ranking List" 30 that sorts the geographic regions depicted in the polygon layer 12 on the map 10 based upon the variable selected in the criteria input dialog 23. For example, zip codes may be sorted according to number of businesses for the user-defined industry sector within each zip code. This list 30 is interactively tied to the polygon layer 12. Thus, rolling over an item in the list 30 highlights the corresponding polygon region 18 in the polygon layer 12 on the map 10, and selecting an item from the list 30 selects the corresponding region 18.

c. Interactive time line 31. A control 45 enables users to scroll across a range of years and select a year 46. Setting the year 46 (1) updates both thematic polygon and point layers 12, 13 to reflect data from that year 46, (2) updates all lists and area reports to reflect statistics from that year 46, (3) re-sorts the areas within the "region ranking list" 30 based upon the distribution of elements within each region (ie, number of jobs, businesses, etc) for the selected year 46, and (4) extends a flag 47 out of the side of the control 45 depicting the selected year 46.

d. An on/off toggle 32 that controls (1) whether the elements within the legend 28 are visible and (2) whether the polygonal map regions are colored.

c) Selectable Point List 26. Referring to FIG. 4, a "selectable point list" 26 contains all individual items (such as specific businesses) that directly correspond to the criteria chosen by the user 25. The items chosen per the user's criteria are listed in a selectable point list 26 and appear in the point layer 13, portraying a disaggregated layer over the aggregated thematic polygon layer 12. The selectable point list 26 has the same interactive relationship with the point map as does the "region ranking list" 30 with regard to the polygon layer 12. Thus, rolling over an item in the list 26 highlights the corresponding point on the point layer 13 on the map 10 and selecting the item from the list 26 selects the corresponding point. Likewise, an on/off toggle 27 controls the visibility of the selectable point list items 26 and mapped point layer 13.

Figure 7:
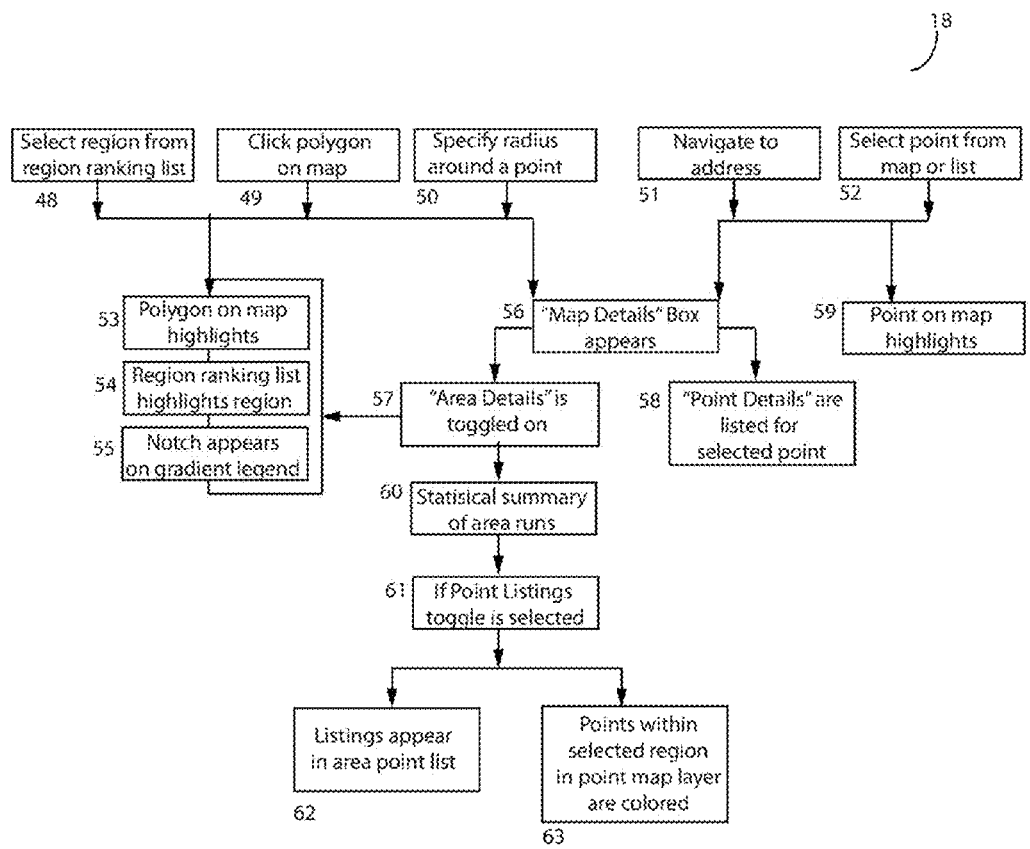
FIG. 7 is a flow chart of selecting a region.
Figure 8:
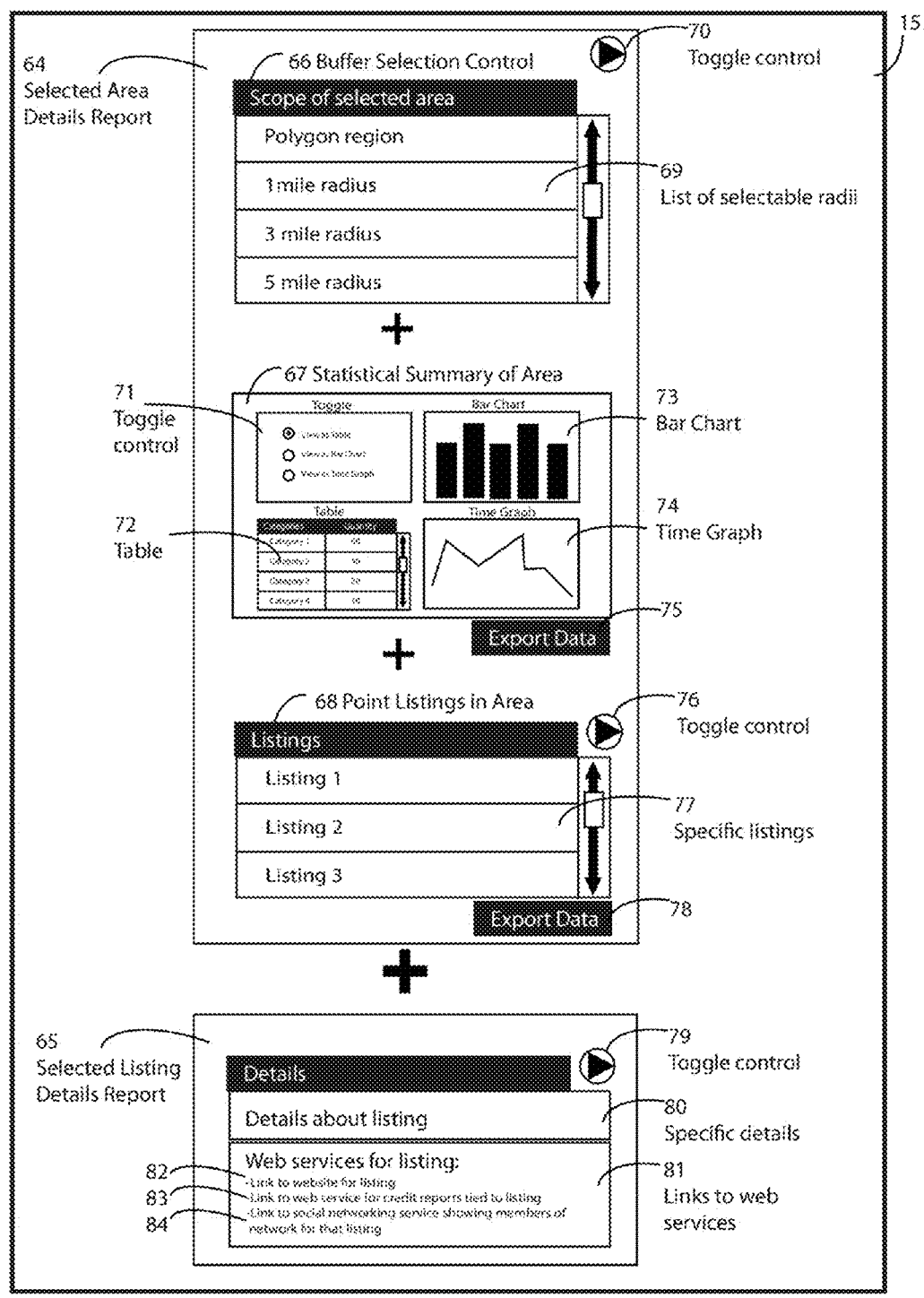
FIG. 8 is a diagram of the map details box for a selected region.

2) Selected Area Report 15: The second type of Local Area Report is a "Selected Area Report." As shown in FIG. 3, a "Selected Area Report" (or "Map Details Box") 15 appears whenever a user selects a region or point from a list or one of the layers 12, 13 on the map 10. Referring to FIG. 7, users may select a region or point in several ways:
   a. by clicking an item from the "region ranking list" 30 in the interactive thematic legend 28 of FIG. 6 (48),
   b. by clicking a polygon on the polygon layer 12 on the map 10 (49),
   c. by specifying a radius around a point/address 50,
   d. by inputting an address or zip code upon which to dynamically re-center the map 51,
   e. by selecting a point from the selectable point list 26 (FIG. 4) or by clicking a point on the point layer 12 on the map 10 (52). In this case, the point highlights on the map 10 (59) and the "Map Detail Box" selected area report 15 opens 56, which as is seen in FIG. 8 features a "Point Details" report 65 (58). If a user toggles the "Area Details" toggle 70 to the open position 57, the region in the polygon layer 12 within which the selected point in the point layer 13 is located becomes selected 53 and a statistical summary report 64 is automatically generated for the selected region 60.

As FIG. 7 illustrates, once a region is selected, several events occur: a "Map Details" box 15 appears 56, the selected region is highlighted on the polygon layer 12 on the map 10 (53), the selected region is likewise highlighted in the region ranking list 30 (FIG. 6) 54, a notch 44 appears on the gradient legend bar 55, and if the "point listings" toggle 27 (FIG. 4) is in the "on" position 61, then any point elements located inside/corresponding to the selected region are highlighted on the point layer 13 on the map 10 (63) and the point listings box 26 (FIG. 4) is populated with the records associated with the mapped point elements 62.

Figure 9:
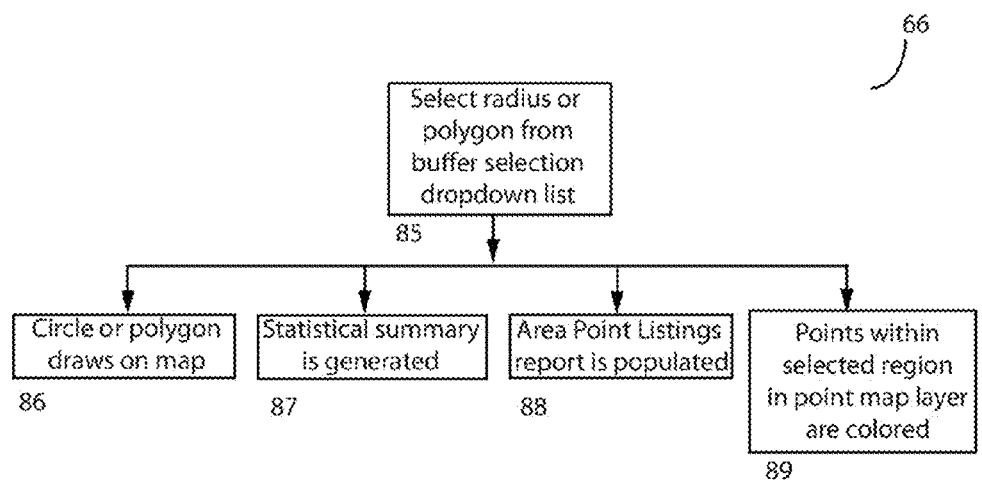
FIG. 9 is a flow chart of selecting a buffer around a point.
Figure 15:
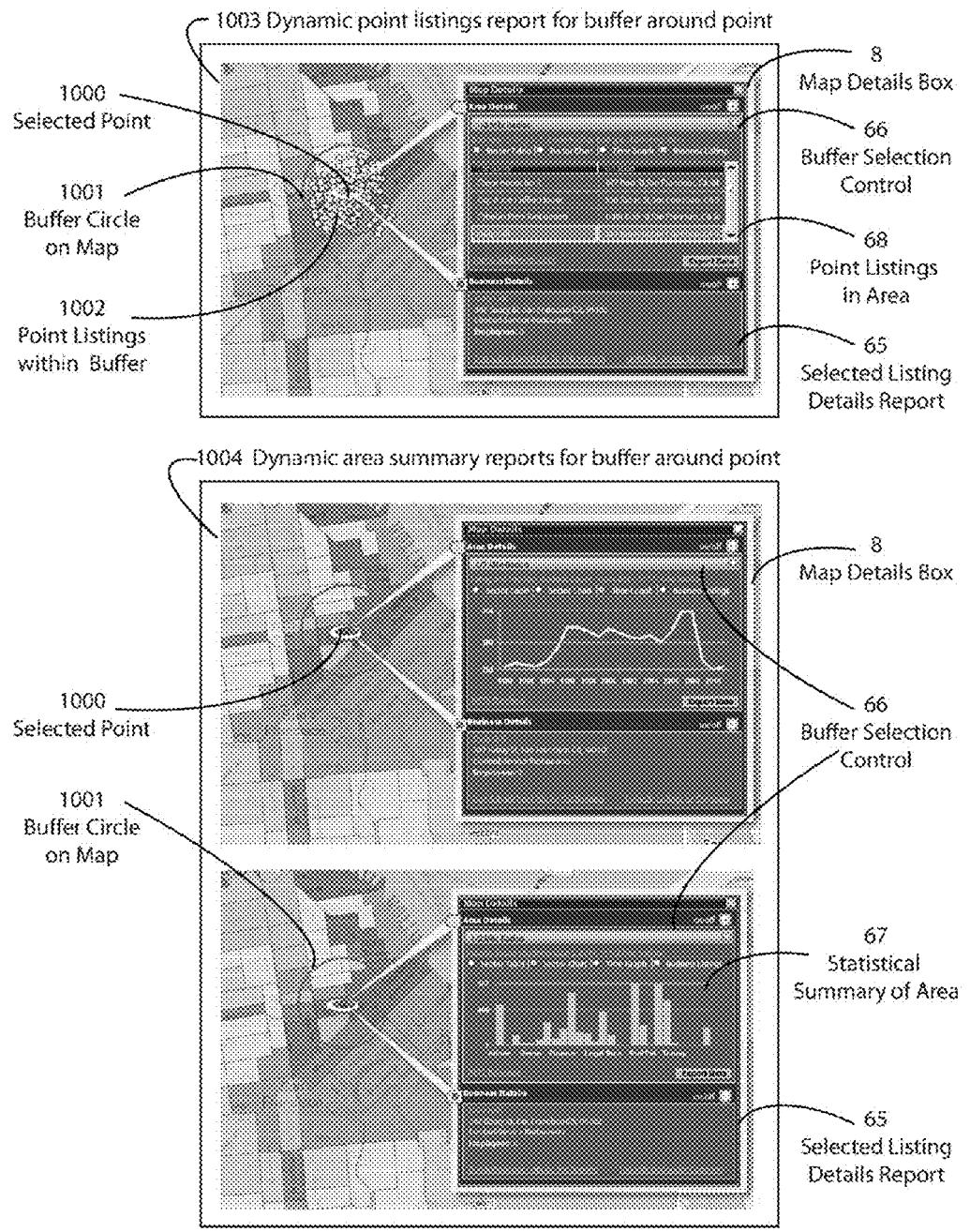
FIG. 15 is a diagram showing buffer selection around a selected point.

As shown in FIG. 3, the "Selected Area Report" or "Map Details Box" 15 may be a dragable window that 'hovers' above the map extent 17. The box 15 contains reports about both the selected polygonal region 18 in the polygon layer 12 and any selected point elements 19 in the point layer 13 and corresponding to/contained within the selected region. An arrow 14 extends between the box 15 and the selected region 18 on the map 10, connecting the two. Specifically, and turning now to FIG. 8, the "Map Details Box" 15 includes (a) a "Selected Area Details" report 64 and (b) a "Selected Listing Details" report 65.
   a. Selected Area Details Report 64. The "Selected Area Details Report" is an interactive, toggle-controlled report of the aggregated statistics within a selected region 18. It contains (i) a buffer selection control 66, (ii) a statistical summary for the area 67, and (iii) point listings of the individual points corresponding to/contained within the selected region 18 (68). If the on/off toggle 70 is in the "on" position, the buffer selection control 66, statistical summary 67 and point listings 68 are all visible to the user. If in the "off" position, all three become invisible.
      i. Buffer selection control 66. As shown in FIG. 15, a user can select a region around any selected point 1000 or address by selecting from a list of user-defined radii 69 (e.g., 1 mile, 3 mile, 5 mile, etc.; FIG. 8). As shown in FIG. 9, once a user selects a radius 85, a circle is drawn on the map 86, 1001 indicating the distance around the point, all point items within that region are highlighted 89, 1002 and listed in the area point listings 88, 1003, and a dynamic "Statistical Summary" is generated 87, 1004.
      ii. Statistical summary of area 67. Referring to FIG. 8, every time a region is selected, a statistical summary is automatically generated which provides an aggregated summary across the various categories of data contained within the boundaries of the selected region 18. For example, in a business-related VUE, this statistical summary may list the number of businesses, jobs and sales per industry sector contained within the selected region. If the VUE features a time series dataset, then the statistical summary displayed in this area will be for the year selected. A toggle control 71 enables a user to choose how to display the statistical summary, either as a table 72, bar graph 73 or, in the case of a time series dataset, as a time graph 74 which displays how statistics have changed in that area across a range of years. This summary can be exported as a dynamically-generated spreadsheet via an "Export Data" control 75. Time series statistical summary datasets may for example export as a multi spreadsheet workbook, with each page being associated with a year.
      iii. Point listings in area 68. Referring to FIG. 8, if a user turns the area point listings toggle 76 to the "on" position, an area point listings report is populated with the specific data points 77 contained within the statistical summary 67 (e.g., each business record within a specific sector within a selected region 18). In addition, each corresponding point element is rendered in a colored point layer 13 over the map 10. This area point list 68 can also be exported as a dynamically generated spreadsheet via an "Export Data" control 78. Turning the area point listings toggle 76 to the "off" position causes the area point listings 68 to de-populate and the corresponding point layer 13 to disappear.
   b. Selected Listing Details Report 65. If a user selects an item from the area point listings 68, then a "Selected Listing Details" report 65 appears within the Map Details box 15. The "Selected Listing Details Report" 65 is controlled by a toggle 79 and reports specific information related to a selected point element 77 within the selected region 18. The report 65 may include specific details 80, such as a photo, address, contact information, number of employees, etc. relating to the selected point 77. The report 65 may also feature dynamic links to websites and web services 81 which are directly tied to the selected point 77. For example, a "more info" link 82 may open the Google "local details" page for that item. A credit report link 83 calls a web service (such as the aforementioned Dun & Bradstreet) and displays any available credit report for a business corresponding to the selected point 77. A social networking link 84 may also be employed to call a social networking service for a listing of members employed by such a business.

Figure 10:
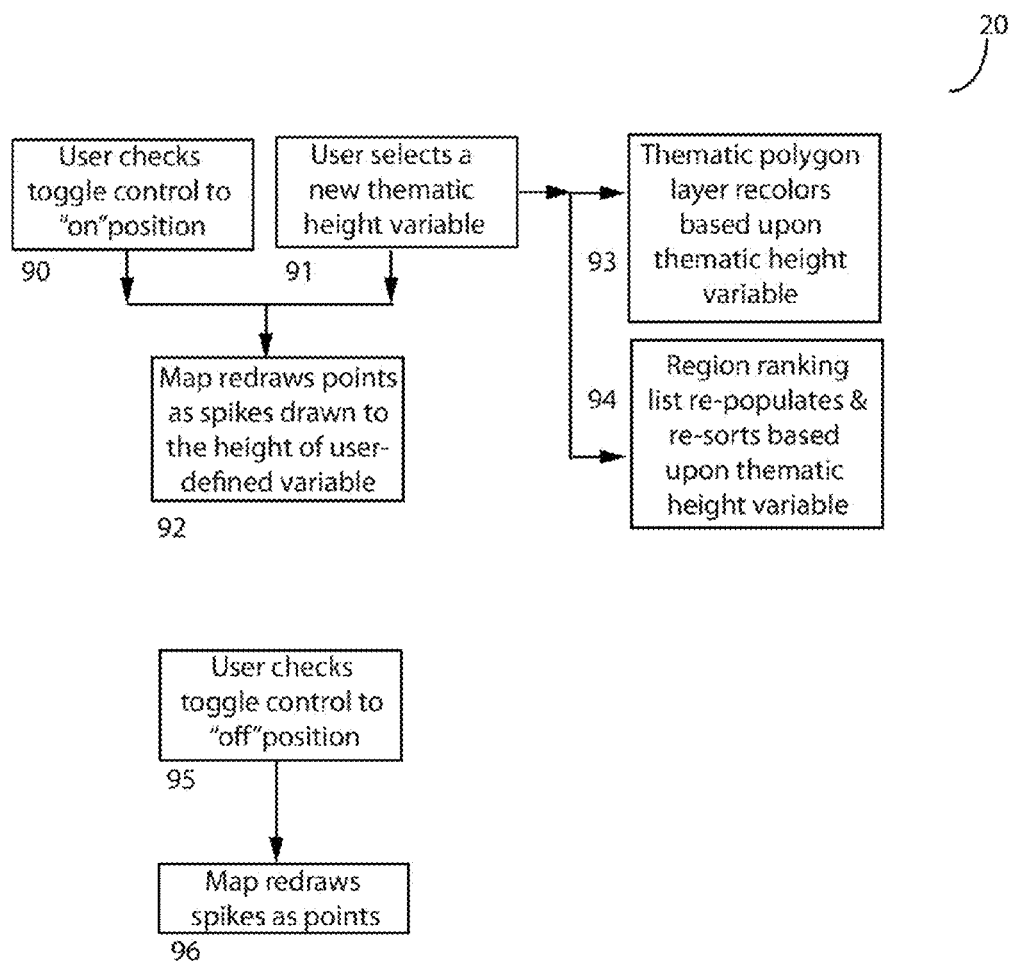
FIG. 10 is a flow chart of changing the thematic height variable and toggling the 3-D control.
Figure 16:
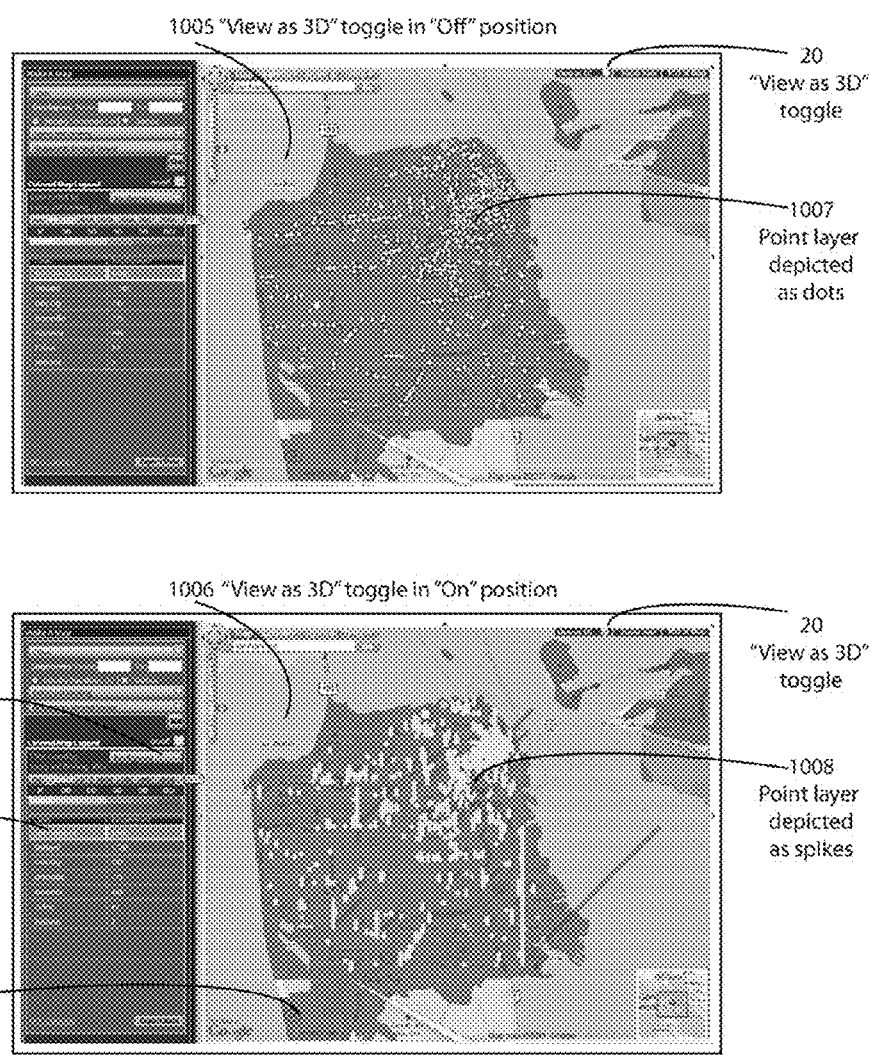
FIG. 16 is a diagram showing 3-D thematic mapping by height.

Supporting Controls:

3-D Toggle for Point Layer: Referring to FIG. 3, a user activated "View-as-3-D" toggle 20 may be employed to redraw the point layer 13 overlaying a map 10 as 3-D spikes or dots. As shown in FIGS. 10 and 16, if a user checks the 3-D toggle control 20 to the "on" position 90, 1006, points in the point layer 13 are rendered as 3-D "spikes" 92, 1008 per a user-defined height variable 91, 1009. For example, a business point layer 13 might use number of employees as the height variable. Accordingly, companies with many employees will appear as very tall spikes, while those with few employees will be depicted as dots. Users may have the option of toggling the "View-as-3-D" control on 90 or off 95. In the off position 1005, points will simply be drawn as round dots 96, 1007. When a user selects a new height variable 91, two other events occur in tandem: the polygon layer 12 recolors based upon the new variable 93, and the region ranking list 30 (FIG. 4) re-sorts 94.

Export Data Control: Referring to FIG. 8, dynamic area reports may be exported to a spreadsheet via pressing an "Export Data" button 75, 78. Elements in the area point listings 68 may be exported as rows on such a spreadsheet. Time series statistical summary datasets may export as a multi-spreadsheet workbook, with each page being associated with a year. For example, business-related time series reports may contain spreadsheets showing the industry sector breakdown across businesses, jobs and sales for every year since 1990.

PDF-of-map control: Referring to FIG. 3, a user activated button 22 dynamically generates a pdf (personal document format) file of the mapped area shown within the map extent 17. This pdf may include an image of the map 10 and a legend which is dynamically composed based upon the various elements/items/points that are depicted in/correspond to the visible map 10.

Zoom-to-Item Control: Referring to FIG. 3, a user activated button 21 zooms and centers the map extent 17 upon a selected item in the map VUE. When the map 10 redraws at the new zoom level, more detailed data is rendered in the point 13 and polygon 12 layers.

Figure 12:
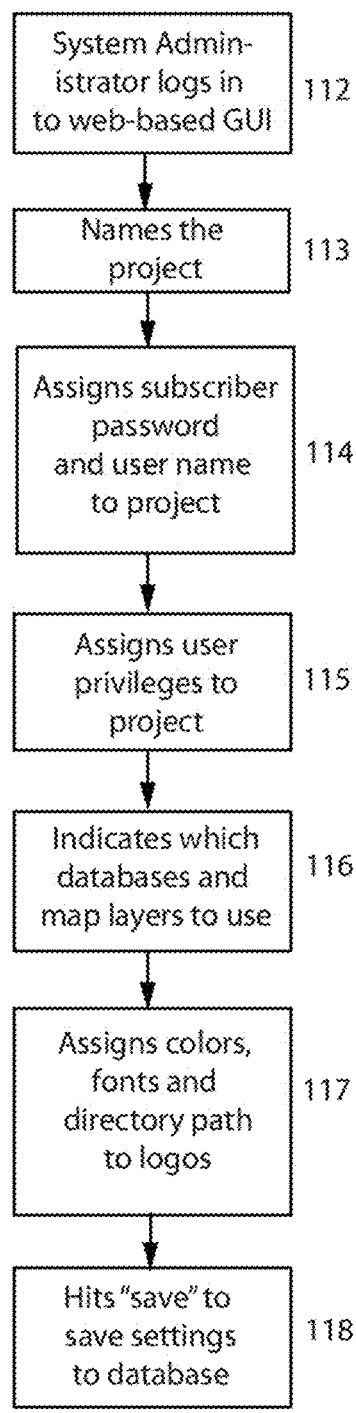
FIG. 12 is a flow chart of the Administrative Customization GUI.
Figure 17:
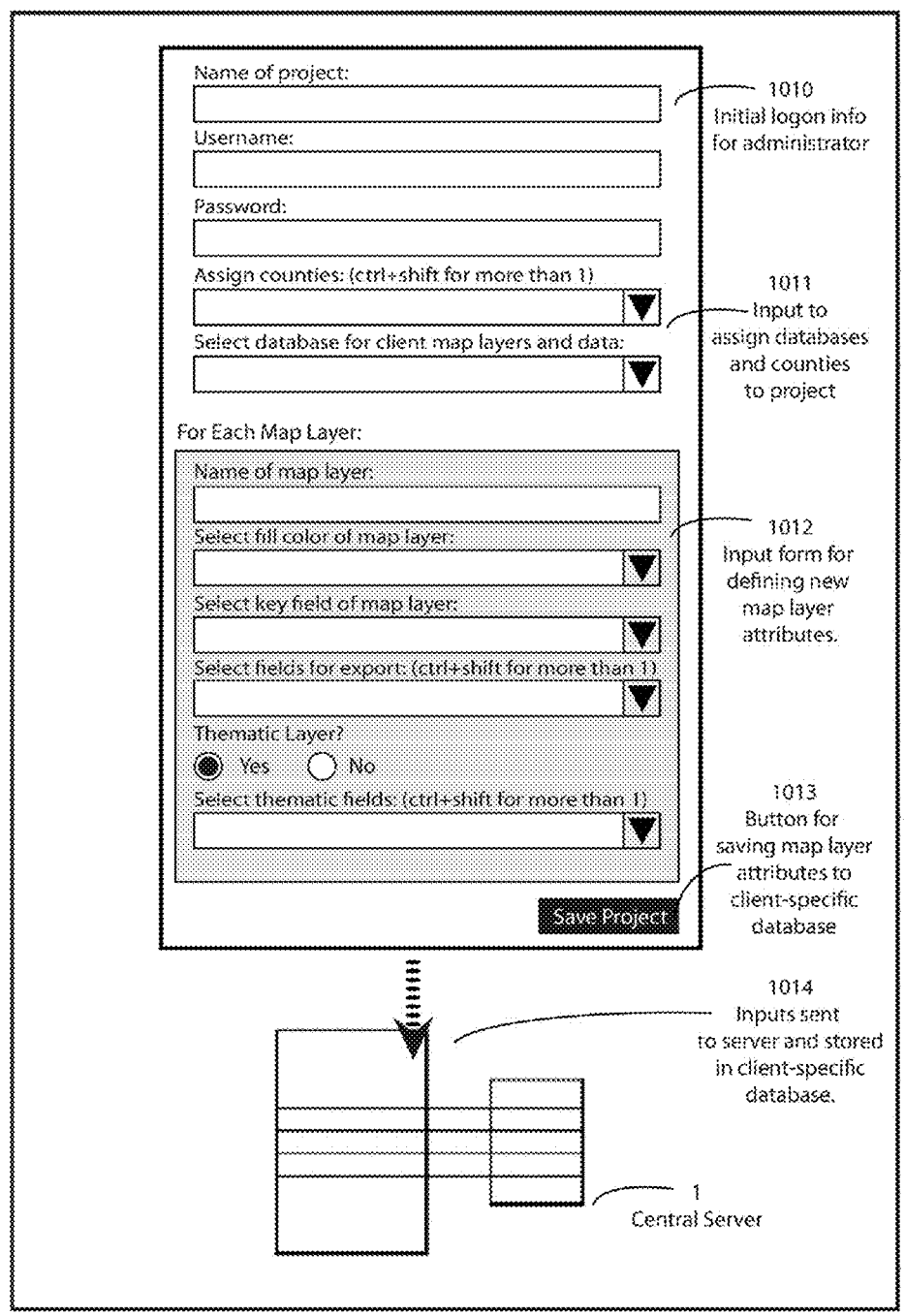
FIG. 17 is a diagram showing an Administrative Customization Interface.

GUI Customization Interface: Referring to FIG. 2, a separate web-based "Administrative Customization Interface" 7 enables a system administrator to customize the VUE interface 4 per subscriber specifications including desired access to National datasets, local datasets to be included, number of VUEs, overall layout, colors, logos and custom functionality desired by the subscribers. As shown in FIGS. 12 and 17, the system administrator logs into the web-based interface 112, 1010, names the project 113, and assigns a password and username to the project 114. This username/password, in turn, will serve as login credentials for the subscriber. At this time, the system administrator also assigns privileges to subscribers 115, indicates which databases, counties and map layers will be used by the subscriber 116, 1011, assigns fonts, colors and logos to the project's map layers 117, 1012 and, once satisfied, saves the settings to the administrative database 118, 1013, 1014. After the settings are saved, the next time the subscriber accesses the website while using the assigned username and password, s/he will see all the customized settings in the VUE.

2. Pay-As-You-Go Interface

Figure 11:
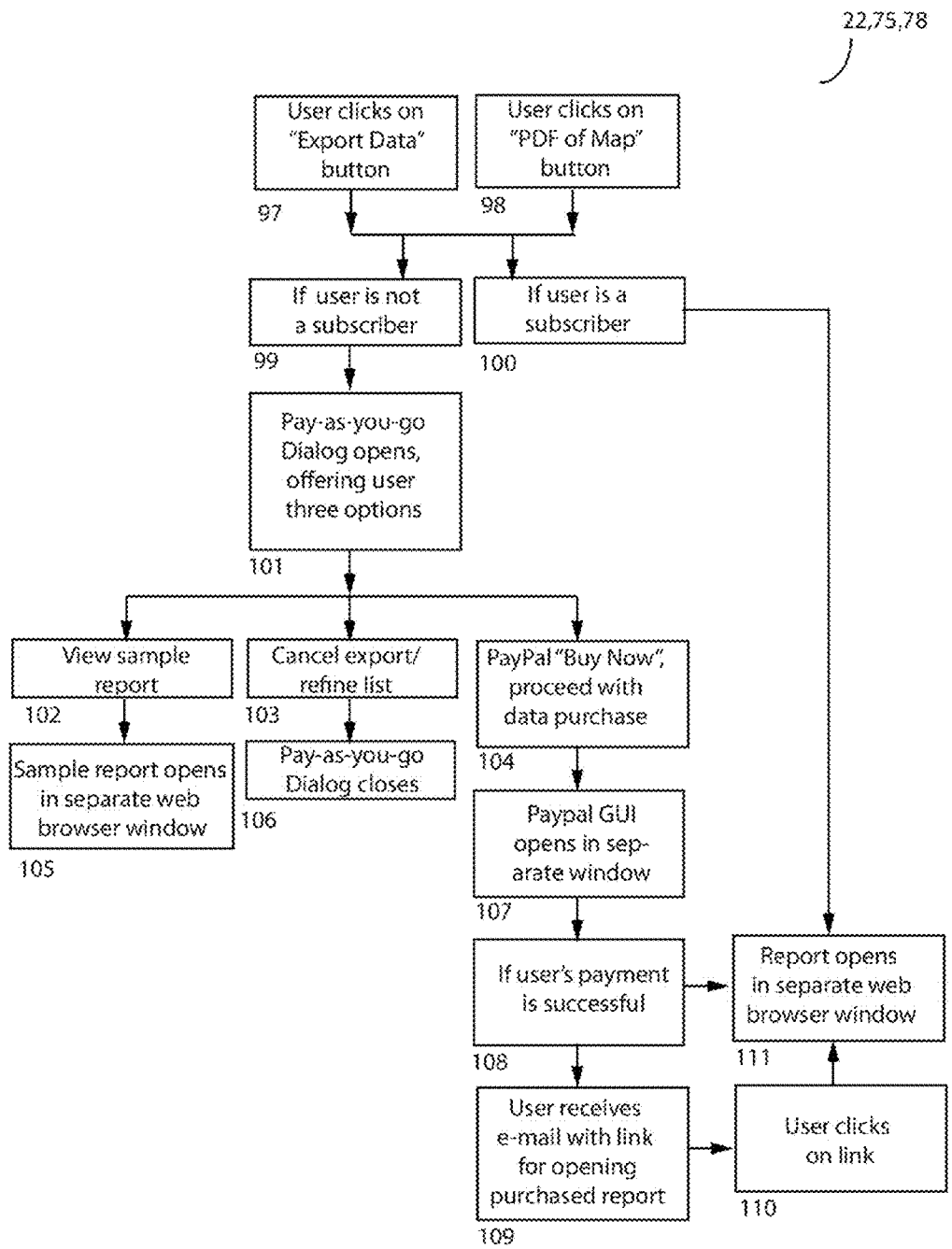
FIG. 11 is a flow chart of exporting spreadsheets or pdfs for subscribers or pay-as-you-go customers.
Figure 18:
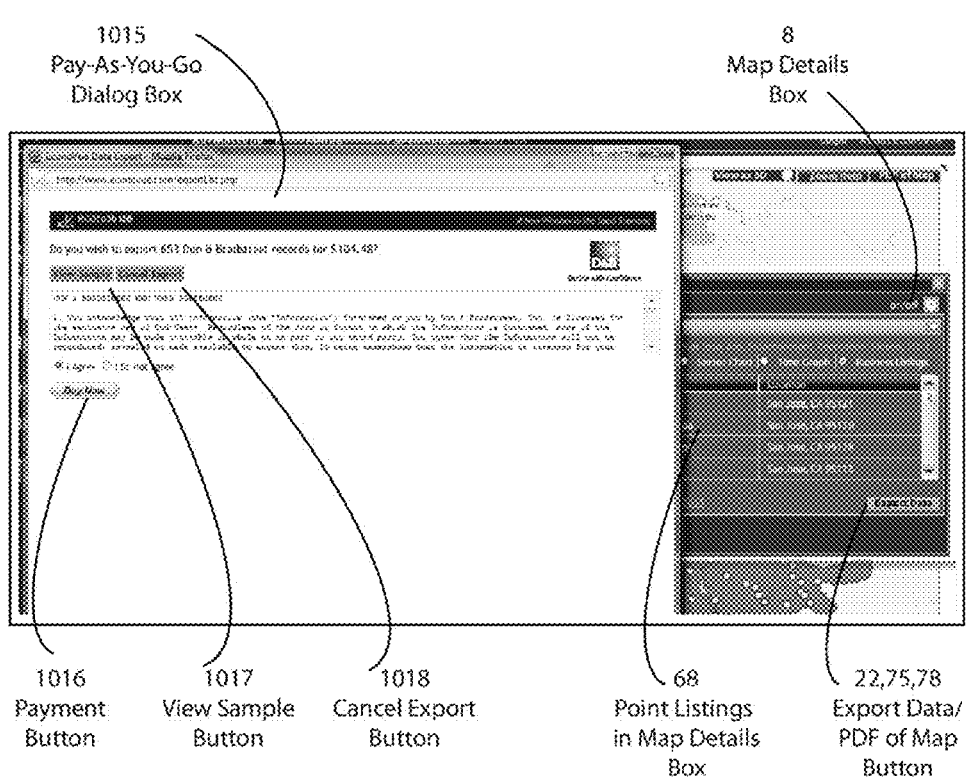
FIG. 18 is a diagram showing a pay-as-you-go GUI.

Referring to FIG. 2, the second major component of the present invention system is a "pay-as-you-go" interface for non-subscribers to purchase and export data 5. As FIGS. 11 and 18 show, the "pay-as-you-go" interface features a dialog box 101, 1015 that appears when a non-subscriber 99 presses the "Export Data" 75, 78 (97) or "PDF-of-map" 22 buttons (98). If a user is a subscriber 100, on the other hand, the data report or pdf map to be exported opens directly in the client's web browser 111.

The non-subscriber "pay-as-you-go" dialog 101, 1015 gives the user the options of: continuing on to a credit card checkout 104, 1016, cancelling the export to modify the search criteria in order to refine the list to be exported 103, 1018, or viewing a sample report of the item prior to purchase 102, 1017. If the user chooses to view the sample report 102, 1017, a mock report will open in a separate browser window 105. If s/he chooses to refine the list to be exported, s/he will click a "Cancel" button 103, 1018, and the "pay-as-you-go" dialog will close 106, enabling the user to modify search criteria. If the user decides to proceed with the purchase, then s/he will click a "Buy Now" button 104, 1016, which will cause a payment interface to open in a separate window 107. If the user's payment is successful 108, a data report, map pdf, or the like will open in the user's web browser 111. At this time, s/he will also receive an e-mail with a link 109 which, when clicked 110, will open the purchased report in a separate web browser window 111.

This "pay-as-you-go" feature is believed to have particular utility not previously available with regards to e-commerce interfaces for purchasing address-related data. First, it enables users to see the data they are going to purchase within a GIS analytical spatial/temporal context prior to purchasing it. Notably, the software for the GUI is intended to prevent a user from "scraping" the data from the data display prior to purchase. Secondly, the ability to modify the search criteria and highly refine the export list is significantly different from the common method employed in address-list e-commerce where users must select areas at least the size of a zip code and purchase the data before seeing it.

Figure 13:
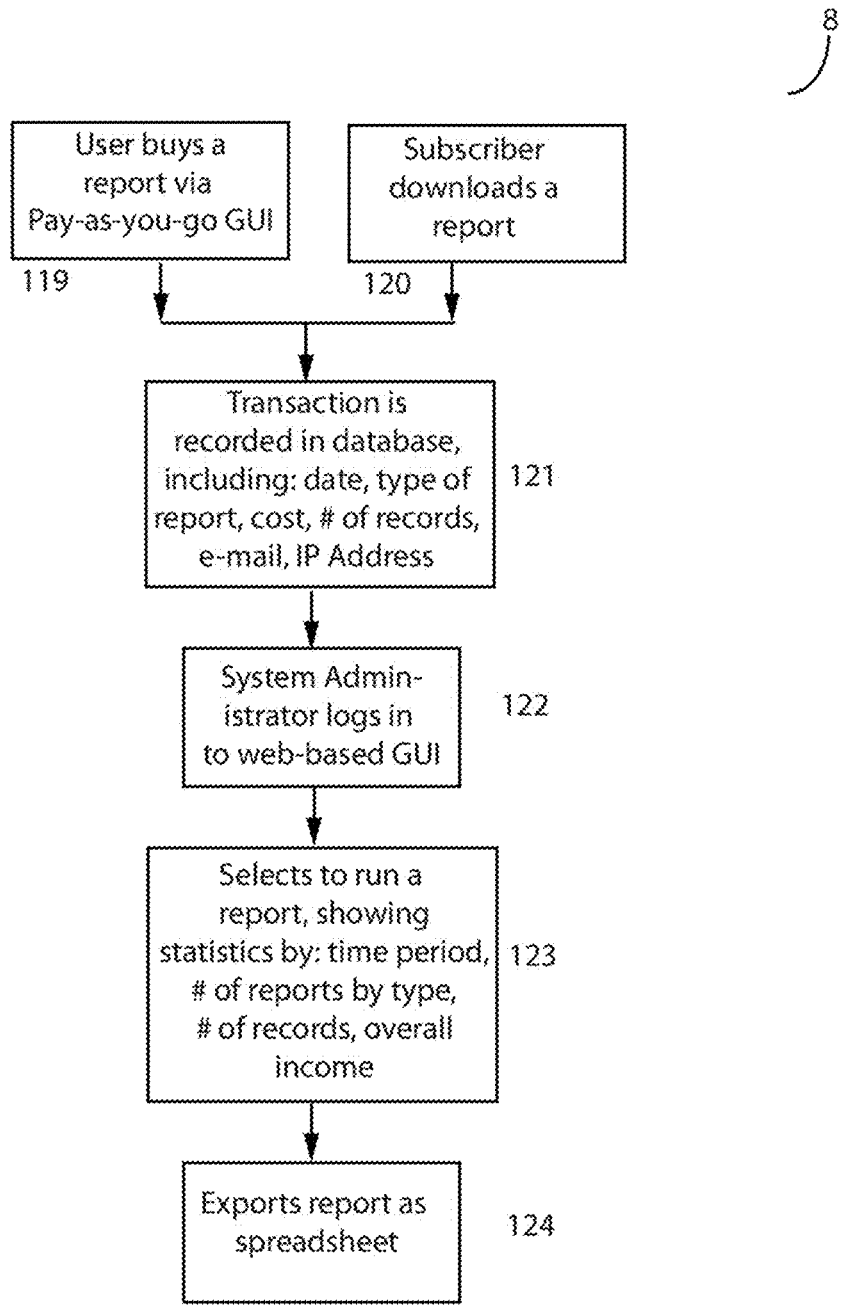
FIG. 13 is a flow chart of the Administrative Accounting GUI.

Accounting Interface. Referring to FIG. 2, a separate web-based Administrative Accounting GUI 8 enables a system administrator to track number of data downloads and pdf reports either purchased by "pay-as-you-go" users or downloaded by subscribers and enables the administrator to generate spreadsheet reports of accounting activity. As FIG. 13 illustrates, when either a user buys and downloads a report via the "pay-as-you-go" interface 119, or a subscriber directly downloads a report 120, the transaction may be recorded in a database 121. The date, type of report, cost, number of records, user's e-mail address and IP address can all recorded at this time. Then, referring to FIGS. 13 and 19, when the system administrator next logs in to the web-based Administrative Accounting GUI 122, 1019, s/he can use an input form 1020 to select an accounting report to run 123, which can output 1021 a display showing accounting statistics by time period, number of reports by type, number of records and, in the case of a "pay-as-you-go" customer, the overall revenue generated by the transaction. The system administrator can then export the report as a spreadsheet 124, 1022.

Figure 14:
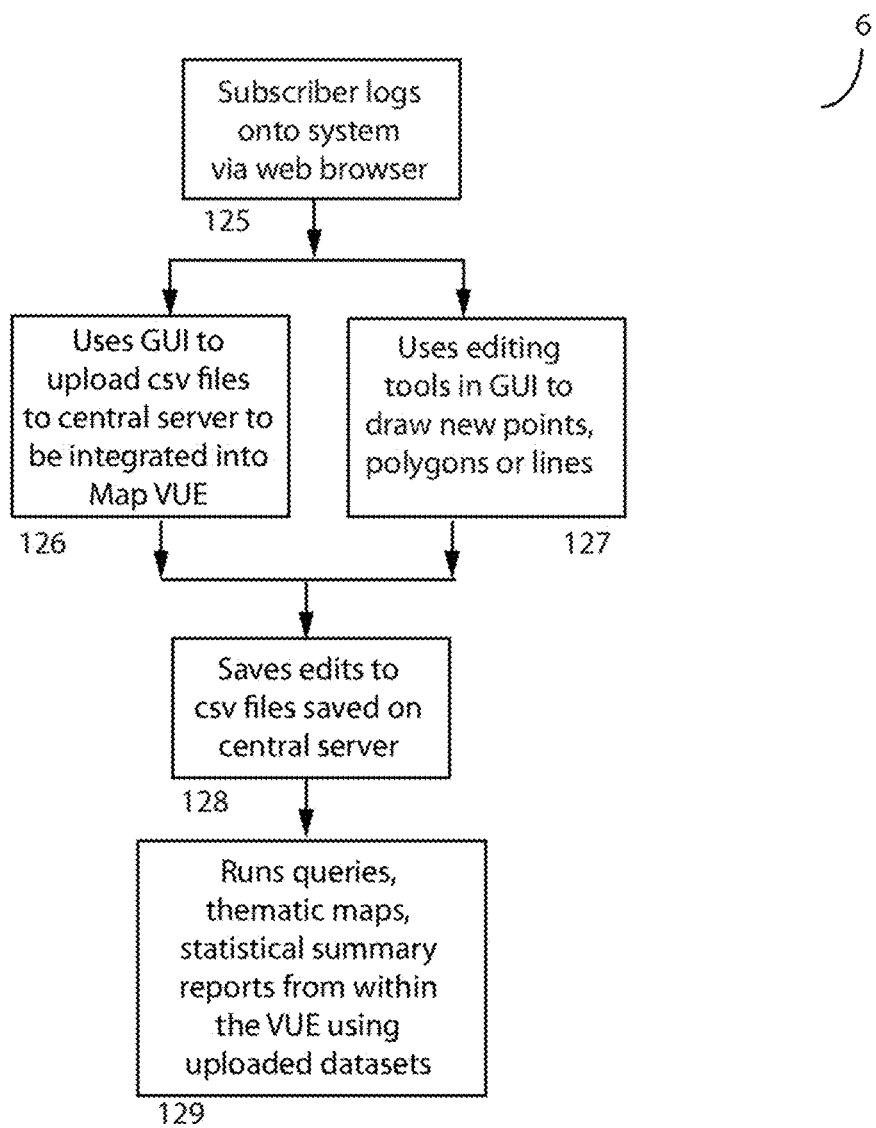
FIG. 14 is a flow chart of working with local datasets via the SaaS GUI.

3. Saas User Dialog for Uploading User Data:

Referring to FIG. 2, the third major component of the present invention system is a Software as a Service (SaaS) User Dialog to enable subscribers to upload and manipulate their own user datasets 6. Referring to FIGS. 14 and 20, after logging on via a web browser 125, 1024, a subscriber is able to upload a local dataset via a dialog 1023 and then view same in a layer 12 or 13 on top of the centrally-served National datasets 126. The uploaded dataset is stored on the same central server 1 as the National data sets, in a private, secure database assigned to the subscriber 1025, 128. This ensures that the privacy of local datasets remains intact, and that the integrity of the central database remains intact.

A local dataset uploaded by the subscriber 126 must contain a geographical reference such as an address, an area or a route. Address-based data will be mapped as points in a point layer 13 on the map 10 and area-based data will be associated with polygonal regions in a polygon layer 13 on the map 10. Data in the dataset may be represented in a csv format or the like 1026, including columns for the geographical reference and attribute information. Attribute fields include the variables for subsequent use in querying and thematic mapping 1027. Once settings are saved via a "Save Settings" button 1028 and uploaded to the central server 1, a local dataset can be used in queries, thematic mapping and statistical summaries available from within a VUE 129.

Subscribers can also generate new layers 12, 13 on a map 10 and save the new layers 12, 13 to the private secure database for access at a later time and/or sharing with other subscribers. Thus, a subscriber can draw a point, line or polygon on top of the map 10 (127), type in attributes to associate with the drawn entity, and then save the drawn entity 128 for later use in queries and/or information retrieval and thematic mapping available from within a VUE 129.

The computer systems (e.g., central server, end-user or browser computer system, etc.) employed in conjunction with embodiments of the present invention may be implemented by any quantity of any personal or other type of computer system (e.g., IBM-compatible, Apple, Macintosh, laptop, palm pilot, tablet, or other mobile computing devices, etc.), and may include any commercially available operating system (e.g., Windows, OS/2, Unix, Linux, iOS for iPad et al., etc.) and any commercially available software (e.g., browser software, server software etc.) and/or custom software (e.g., software for performing mapping, overlaying, and other functions of present invention embodiments, etc.). The computer systems may be equipped with a display or monitor, a base (e.g., including a processor, memories and internal or external communications devices (e.g., modem, network cards, etc.)), a keyboard and optional mouse or other input device, and the like. The computer systems may include any types of monitors and input devices (e.g., keyboard, mouse, voice recognition, etc.) to enter and/or view information.

It is to be understood that the software for the computer systems of embodiments of the present invention may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of embodiments of the present invention may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among end-user systems and server systems (e.g., client-side or server-side). The modules may be in the form of any suitable software or instructional type code (e.g., scripts, functions, procedures, sub-routines, web or active pages, etc.), where the modules may include any desired names (e.g., the specific names of the functions utilized herein are exemplary and merely utilized for descriptive purposes). The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on any device or apparatus with a recordable or computer readable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

The communication network may be implemented by any quantity of any type of communications network (e.g., LAN, WAN, Internet, Intranet, VPN, etc.). The computer systems of the present invention embodiments may include any conventional or other communications devices to communicate over the networks via any conventional or other protocols. The computer systems may utilize any type of connection (e.g., wired, wireless, etc.) for access to the network.

The databases may be implemented by any quantity of any conventional or other databases (e.g., relational, hierarchical, etc.) or storage structures (e.g., file, data structure, etc.), may be arranged in any fashion and may store any desired information (e.g., national or local jurisdictional information, business data, demographic data, time-based data, etc.).

The invention claimed is:

1. A method employed with regard to a computing system having a processor and a memory, the memory for storing instructions and the processor for retrieving the instructions from the memory and executing the retrieved instructions, the instructions comprising actions taken by the computing system to implement the method including:

displaying a map on a display associated with the computing system;

overlaying the displayed map with a map-based graphical user interface (GUI), the GUI providing a translucent view corresponding to the displayed map, the view being associated with a particular dataset, the GUI also providing interlocked queries and analysis tools to probe the dataset, the view comprising a polygon layer corresponding to the displayed map and a point layer corresponding to the displayed map, the polygon layer and the point layer working in tandem to simultaneously display both aggregated and disaggregated data across the displayed map;

the point layer overlaying the displayed map and showing for each of a plurality of specific items a location of the specific item on the displayed map, each shown item being tied to and listed in a selectable point list displayed by the GUI on the display;

the polygon layer overlaying the displayed map and showing a thematic display of information aggregated to sub-regions on the displayed map, the aggregated information for each sub-region being derived from the items in the point layer located on the displayed map within the sub-region;

receiving from the user a selection of one of the specific items of the point layer or one of the sub-regions of the polygon layer; and modifying both the point layer and the polygon layer in response to the received selection and according to the dataset so as to provide additional selectable information relating to the dataset corresponding to the received selection and also to provide additional selectable information relating to the dataset that may be of interest to the user, modifying both the point layer and the polygon layer in response to the received selection and according to the dataset comprising rendering both the point and polygon layers such that a sub-region related to the selection is highlighted and all points located inside the highlighted sub-region are displayed, retrieving from the dataset information relating to the displayed points, generating from the retrieved information a list of entities, each entity corresponding to a displayed point, generating from the retrieved information a statistical summary of the highlighted sub-region, and displaying along with the map the generated list of entities and generated statistical summary.

2. The method of claim 1 comprising overlaying the map with a GUI providing a view associated with a time-series dataset, and further comprising receiving a command from the user to navigate among and display different time periods available from the time-series dataset, each time period differing from every other time period while the displayed map remains the same, whereby the user can review differing time periods of the time-series dataset for the same displayed map.

3. The method of claim 1 comprising overlaying the map with a GUI providing multiple translucent views corresponding to the displayed map, each view being associated with a differing dataset, and further comprising receiving a command from a user to navigate among and display individual ones of the views over the displayed map, each view and the corresponding dataset differing from every other view and the corresponding datasets while the displayed map remains the same, whereby the user can review the differing datasets for the same displayed map.

4. The method of claim 1 comprising receiving a selection from the user of a global variable defining a type for the sub-regions in the polygon layer of the map, each sub-region in the polygon layer comprising a polygon defined according to the defined type.

5. The method of claim 1 wherein the polygon layer overlaying the displayed map shows a thematic display of information aggregated to sub-regions on the displayed map, each sub-region being colored according to a color scale, the color of the sub-region corresponding to a magnitude of the aggregated information for the sub-region.

6. The method of claim 1 further comprising receiving a selection from the user of an item from the displayed point list and simultaneously selecting the corresponding shown item from the point layer and also simultaneously selecting the corresponding sub-region of the polygon layer in which the shown item lies, or receiving a selection from the user of a shown item from the point layer and simultaneously selecting the corresponding item from the displayed point list and also simultaneously selecting the corresponding sub-region of the polygon layer in which the shown item lies, and displaying a map details box on the display, the displayed map details box having therein more detailed information about the selected item including a selectable link to a related service.

7. The method of claim 1 further comprising rendering each shown item in the point layer as a spike, the spike having a height according to a height scale, the height of the spike corresponding to a magnitude of a pre-determined attribute associated with the shown item.

8. The method of claim 1 further comprising dynamically redrawing the polygon layer with differing sub-regions depending upon a zoom level of the displayed map.

9. The method of claim 1 further comprising displaying a local area report corresponding to the view, the local area report including a map extent area report summarizing information in the point layer and polygon layer for the displayed map, and including a criteria input dialog for allowing the user to change variables by which to query for information corresponding to the displayed map, an interactive thematic legend associated with the polygon layer, and the selectable point list associated with the point layer.

10. The method of claim 1 further comprising receiving from the user a selection of a sub-region from the polygon layer, highlighting the selected region on the polygon layer, highlighting the selected region in a displayed region ranking list, highlighting any items of the point layer located inside/corresponding to the selected sub-region, and populating the selectable point list with information corresponding to the highlighted points, whereby the user may then select an item from the selectable point list for more information corresponding to the selected item.

11. The method of claim 1 further comprising displaying a selected area report corresponding to a selected sub-region, the selected area report including a selected area details report of aggregated statistics within a selected region, a statistical summary of the selected sub-region across various categories of data, and a listing of items in the selected sub-region, the listing of items having associated therewith a control by which the user can download the listing of items and data associated with each item in the listing of items, the statistical summary likewise having associated therewith a control by which the user can download the statistical summary and data associated therewith.

12. The method of claim 1 further comprising receiving from the user the particular dataset of the view, the received dataset including address-based data to be represented by items in the point layer and area-based data to be represented by sub-regions in the polygon layer.

13. The method of claim 1 further comprising iteratively receiving from the user selections of items from the point layer, sub-regions from the polygon layer, and attributes used to query for items to be displayed in the point layer and sub-regions to be displayed in the polygon layer until the user settles on a list of items of interest and/or a list of sub-regions of interest, receiving from the user a request to download the settled list and data associated with each item or sub-region in the selected list.

14. A computing system having a processor, a memory, and a display, the memory for storing instructions and the processor for retrieving the instructions from the memory and executing the retrieved instructions, the instructions comprising actions taken by the computing system to show on the display:

a displayed map;

a map-based graphical user interface (GUI) overlaying the displayed map, the GUI providing a translucent view corresponding to the displayed map, the view being associated with a particular dataset, the GUI also providing interlocked queries and analysis tools to probe the dataset, the view comprising a polygon layer corresponding to the displayed map and a point layer corresponding to the displayed map, the polygon layer and the point layer working in tandem to simultaneously display both aggregated and disaggregated data across the displayed map;

the point layer overlaying the displayed map and showing for each of a plurality of specific items a location of the specific item on the displayed map, each shown item being tied to and listed in a selectable point list displayed by the GUI on the display;

the polygon layer overlaying the displayed map and showing a thematic display of information aggregated to sub-regions on the displayed map, the aggregated information for each sub-region being derived from the items in the point layer located on the displayed map within the sub-region;

the system upon receiving from the user a selection of one of the specific items of the point layer or one of the sub-regions of the polygon layer modifying both the point layer and the polygon layer in response to the received selection and according to the dataset so as to provide additional selectable information relating to the dataset corresponding to the received selection and also to provide additional selectable information relating to the dataset that may be of interest to the user, the system modifying both the point layer and the polygon layer in response to the received selection and according to the dataset comprising rendering both the point and polygon layers such that a sub-region related to the selection is highlighted and all points located inside the highlighted sub-region are displayed, retrieving from the dataset information relating to the displayed points, generating from the retrieved information a list of entities, each entity corresponding to a displayed point, generating from the retrieved information a statistical summary of the highlighted sub-region, and displaying along with the map the generated list of entities and generated statistical summary.

15. The system of claim 14 wherein the display shows a GUI overlaying the map and providing a view associated with a time-series dataset, the system receiving commands from the user to navigate among and display different time periods available from the time-series dataset, each time period differing from every other time period while the displayed map remains the same, whereby the user can review differing time periods of the time-series dataset for the same displayed map.

16. The system of claim 14 wherein the display shows a GUI overlaying the map and providing multiple translucent views corresponding to the displayed map, each view being associated with a differing dataset, the system receiving commands from a user to navigate among and display individual ones of the views over the displayed map, each view and the corresponding dataset differing from every other view and the corresponding datasets while the displayed map remains the same, whereby the user can review the differing datasets for the same displayed map.

17. The system of claim 14 wherein the polygon layer overlaying the displayed map shows a thematic display of information aggregated to sub-regions on the displayed map, each sub-region being colored according to a color scale, the color of the sub-region corresponding to a magnitude of the aggregated information for the sub-region.

18. The system of claim 14 wherein the display shows each shown item in the point layer as a spike, the spike having a height according to a height scale, the height of the spike corresponding to a magnitude of a pre-determined attribute associated with the shown item.

19. The system of claim 14 wherein the display further shows a local area report corresponding to the view, the local area report including a map extent area report summarizing information in the point layer and polygon layer for the displayed map, and including a criteria input dialog for allowing the user to change variables by which to query for information corresponding to the displayed map, an interactive thematic legend associated with the polygon layer, and the selectable point list associated with the point layer.

20. The system of claim 14 wherein the display further shows a selected area report corresponding to a selected sub-region, the selected area report including a selected area details report of aggregated statistics within a selected region, a statistical summary of the selected sub-region across various categories of data, and a listing of items in the selected sub-region, the listing of items having associated therewith a control by which a user can download the listing of items and data associated with each item in the listing of items, the statistical summary likewise having associated therewith a control by which the user can download the statistical summary and data associated therewith.

21. The method of claim 1 further comprising:
displaying a report corresponding to a selection from the user, the report having associated therewith a control by which the user can download data relating to the report;
receiving from the user a selection of the control associated with the report and in response thereto engaging in a dialog with the user;
obtaining based on the dialog payment from the user for the data to be downloaded; and
downloading the data to the user upon obtaining the payment.

22. The method of claim 21 further comprising providing the user with a sample of the data prior to downloading same, the sample being a subset of the data to be reviewed by the user, the user reviewing the sample to decide whether to submit payment for the data.

23. The method of claim 21 comprising overlaying the map with a GUI providing a view associated with a time-series dataset, and further comprising receiving a command from the user to navigate among and display different time periods available from the time-series dataset, each time period differing from every other time period while the displayed map remains the same, whereby the user can review differing time periods of the time-series dataset for the same displayed map, the method further comprising downloading the data including data relating to at least some of the different time periods available from the time-series dataset.

* * * * *